US012194732B2

(12) United States Patent
Uda et al.

(10) Patent No.: US 12,194,732 B2
(45) Date of Patent: Jan. 14, 2025

(54) INKJET PRINTING APPARATUS, AND A CONTROL METHOD THEREFOR

(71) Applicant: SCREEN HOLDINGS CO., LTD., Kyoto (JP)

(72) Inventors: Takahiro Uda, Kyoto (JP); Mitsuru Tanemoto, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 196 days.

(21) Appl. No.: 17/792,963

(22) PCT Filed: Mar. 9, 2021

(86) PCT No.: PCT/JP2021/009238
§ 371 (c)(1),
(2) Date: Jul. 14, 2022

(87) PCT Pub. No.: WO2021/193009
PCT Pub. Date: Sep. 30, 2021

(65) Prior Publication Data
US 2023/0050269 A1 Feb. 16, 2023

(30) Foreign Application Priority Data
Mar. 24, 2020 (JP) ................................ 2020-052713

(51) Int. Cl.
*B41J 11/00* (2006.01)
*G03G 15/20* (2006.01)

(52) U.S. Cl.
CPC ........ *B41J 11/00242* (2021.01); *G03G 15/20* (2013.01)

(58) Field of Classification Search
CPC ... B41J 11/00; B41J 11/04; B41J 11/42; B41J 2/01; B41J 29/38; B41J 29/377;
(Continued)

(56) References Cited

U.S. PATENT DOCUMENTS 5,634,402 A * 6/1997 Rudd ................. B41J 11/00214 34/267
5,856,652 A * 1/1999 Mayuzumi ............ C30B 25/105 219/390
(Continued)

FOREIGN PATENT DOCUMENTS

JP H11-038828 A 2/1999
JP 2008-001114 A 1/2008
(Continued)

OTHER PUBLICATIONS

Office Action issued in corresponding Japanese Patent Application No. 2020-052713, dated Sep. 26, 2023, with English translation.
(Continued)

*Primary Examiner* — John Zimmermann
(74) *Attorney, Agent, or Firm* — Rimon P.C.

(57) ABSTRACT

When a disconnection detecting circuit detects failure, a controller of a temperature controller manipulates a duty ratio to distribute the duty ratio to normal heating rollers. Since the amount of heat decreased by failure of a heating roller can be compensated for by the other heating rollers, no defective drying will occur. It is not necessary to stop a printing process immediately when the disconnection detecting circuit detects failure, but a maintenance operation can be carried out after fully securing a preparation time for maintenance. The quick maintenance can be performed to restrain downtime of the printing apparatus.

6 Claims, 6 Drawing Sheets

(58) Field of Classification Search
CPC ....... B41J 15/04; B65H 23/185; G03G 15/20; F26B 13/10
See application file for complete search history.

(56) References Cited

U.S. PATENT DOCUMENTS

| | | | | |
|---|---|---|---|---|
| 6,244,700 | B1 * | 6/2001 | Kimura | B41J 11/00216 347/102 |
| 6,927,368 | B2 * | 8/2005 | Cao | G03G 15/2039 219/505 |
| 10,183,503 | B2 * | 1/2019 | Yoshinuma | B41J 11/00212 |
| 11,518,181 | B2 * | 12/2022 | Washizawa | B41J 11/0085 |
| 2007/0047990 | A1 * | 3/2007 | Lemaster | G03G 15/5004 399/70 |
| 2012/0206527 | A1 * | 8/2012 | Leighton | B41J 11/00216 392/407 |
| 2013/0015285 | A1 * | 1/2013 | Uruma | B65H 20/005 242/420.5 |
| 2013/0044171 | A1 * | 2/2013 | Sasaki | B41J 11/00216 347/102 |
| 2014/0204157 | A1 * | 7/2014 | LeFevre | B41J 13/076 347/101 |
| 2015/0002571 | A1 | 1/2015 | Kono et al. | |
| 2022/0111666 | A1 * | 4/2022 | Saito | B41J 25/006 |

FOREIGN PATENT DOCUMENTS

| | | | |
|---|---|---|---|
| JP | 2010-76404 | A | 4/2010 |
| JP | 2012-223959 | A | 11/2012 |
| JP | 2012-223960 | A | 11/2012 |
| JP | 2013-204849 | A | 10/2013 |
| JP | 2015-205476 | A | 11/2015 |
| JP | 2018-013420 | A | 1/2018 |

OTHER PUBLICATIONS

International Search Report issued in corresponding International Patent Application No. PCT/JP2021/009238, dated May 25, 2021, with English translation.

* cited by examiner

INKJET PRINTING APPARATUS, AND A CONTROL METHOD THEREFOR

CROSS REFERENCE

This application is the U.S. National Phase under 35 U.S.C. § 371 of International Application No. PCT/JP2021/009238, filed on Mar. 9, 2021, which claims the benefit of Japanese Application No. 2020-052713, filed on Mar. 24, 2020, the entire contents of each are hereby incorporated by reference.

TECHNICAL FIELD

This invention relates to an inkjet printing apparatus for printing on a printing medium by dispensing ink droplets thereto, and a control method therefor.

BACKGROUND ART

Conventionally, this type of apparatus includes inkjet heads, a transporting path, and a drying unit (see Patent Document 1, for example). The inkjet heads perform printing by dispensing ink droplets to web paper transported along the transporting path. The drying unit is disposed downstream of the inkjet heads for performing a drying process on the printed web paper with the ink droplets dispensed thereto. The drying unit has a plurality of heaters (also called heating rollers) arranged along the transporting path, for example. The heaters have halogen lamps inside, for example. The drying unit carries out feedback control of the plurality of heaters to a temperature according to printing conditions, and has a disconnection detecting circuit for detecting whether or not the halogen lamps are disconnected. When the disconnection detecting circuit detects a disconnection, the occurrence of error is reported to prevent defective drying.

PRIOR ART DOCUMENT

Patent Document

[Patent Document 1]
Unexamined Patent Publication No. 2013-204849 (FIG. 13)

SUMMARY OF INVENTION

Technical Problem

However, the conventional example with such a construction has the following problem.

That is, in order to eliminate the error and resume the printing process, the conventional apparatus is required to perform maintenance to change the halogen lamp having broken down due to a disconnection or the like. For this purpose, the apparatus must be stopped when the failure of the halogen lamp is detected, and thereafter an operation must be carried out for changing the halogen lamp. There is a problem of necessitating an extended downtime.

This invention has been made having regard to the state of the art noted above, and its object is to provide an inkjet printing apparatus which can curb a downtime by substituting normally working heating devices for a failed heating device.

Solution to Problem

To fulfill the above object, this invention provides the following construction.

The invention defined in claim 1 provides an inkjet printing apparatus for dispensing ink droplets from a print head while transporting a printing medium in a predetermined transport direction to print on the printing medium, comprising a drying unit for drying at a predetermined drying temperature the printing medium printed by the print head, and including at least three heating devices arranged downstream of the print head in the transport direction to heat the printing medium; and a temperature controller for operating the drying unit, and controlling to make temperature of the printing medium become the drying temperature by finishing a drying process in the drying unit; the temperature controller including a temperature detector for detecting temperature of each of the heating devices; a controller for manipulating a duty ratio, which is a proportion of ON time of each of the heating devices, according to the temperature detected by the temperature detector; a storage unit for storing the duty ratio in time series of each of the heating devices; and a failure detection unit for detecting failure of each of the heating devices; wherein the controller is configured, when the failure detection unit detects failure, to manipulate the duty ratio to distribute to normal heating devices a missing duty ratio which is the duty ratio before the failure of the failed heating device among the duty ratios stored in the storage units.

[Functions and effects] According to the invention defined in claim 1, the temperature controller controls the drying unit to make temperature of the printing medium become the drying temperature as a result of drying by the drying unit. When the disconnection detecting unit detects failure, the controller of the temperature controller controls the duty ratios to distribute to the normal heating devices the missing duty ratio, among the duty ratios in time series stored in the storage units, which has been given to operate the failed heating device. Consequently, since the amount of heat decreased when the heating device breaks down can be compensated for by the other heating devices, no lowering will occur to the drying ability. As a result, there is no need to stop the printing process immediately when the disconnection detecting unit detects failure, but a maintenance operation can be carried out after fully securing time to prepare for maintenance. Therefore, since a quick maintenance operation can be carried out, the downtime of the apparatus can be restrained. Moreover, since the duty ratio for the failed heating device is distributed based on the duty ratio stored in the storage units, an appropriate drying process can be continued according to print content of the printing process currently carried out. Consequently, even when the heating devices working normally are substituted to continue the printing process, deterioration in print quality due to the drying process can be restrained.

In this invention, it is preferred that the controller is configured, when the failure is detected in one of the at least three heating devices, to manipulate the duty ratios so that the remaining heating devices have temperatures gradually higher from most upstream to most downstream, thereby reaching the drying temperature at most downstream (claim 2).

The controller manipulates the duty ratios so that the remaining heating devices have temperatures gradually higher from most upstream to most downstream, thereby reaching the drying temperature at most downstream. Thus, since the temperature of the printing medium is gradually raised, it is possible to prevent defective drying such as wrinkling of the printing medium due to excessive drying at most upstream. As a result, drying quality can be maintained excellent even during a period prior to a maintenance operation.

In this invention, it is preferred that the controller is configured, when the failure is detected in a heating device upstream of a middle one of the at least three heating devices, to distribute the missing duty ratio in a larger quantity to a heating device located relatively upstream than to a heating device located relatively downstream, of the plurality of heating devices excluding the failed heating device (claim 3).

The controller, when the failure is detected in the heating device upstream of the middle one, distributes the missing duty ratio in a larger quantity to the heating device located relatively upstream than to the heating device located relatively downstream, of the plurality of heating devices excluding the failed heating device. In this way, the time after the temperature of the printing medium rises to some extent and before reaching a cooling unit located downstream of the drying unit can be prevented from becoming short. As a result, since the printing medium can be heated sufficiently, it is possible to prevent a defective drying due to insufficient drying even during a period prior to a maintenance operation.

In this invention, it is preferred that the controller is configured, when the failure is detected in a heating device in a middle position of the at least three heating devices, to distribute the missing duty ratio equally to the heating devices upstream and downstream of said heating device (claim 4).

The controller, when the failure is detected in the heating device in the middle position, distributes the missing duty ratio equally to the heating devices upstream and downstream of the heating device. Thus, the missing amount of heat in the middle position can be compensated for evenly by the most downstream and most upstream. The drying time from the start of heating to arrival at the cooling unit can be made substantially the same as in normal time. As a result, a defective drying can be prevented even during a period prior to a maintenance operation.

In this invention, it is preferred that the controller is configured, when the failure is detected in a heating device downstream of a middle one of the at least three heating devices, to distribute the missing duty ratio in a larger quantity to a heating device located relatively downstream than to a heating device located relatively upstream, of the plurality of heating devices excluding the failed heating device (claim 5).

The controller, when the failure is detected in the heating device downstream of the middle position, distributes the missing duty ratio in a larger quantity to the heating device located relatively downstream than to the heating device located relatively upstream, of the plurality of heating devices excluding the failed heating device. When the distribution is made in reversed magnitude, the temperature of the printing medium in the upstream position will rise faster than at normal time. However, such a distribution allows the temperature rise of the printing medium to rise similarly to normal time. So, since an excessive drying of the printing medium can be prevented, a defective drying can be prevented even during a period prior to a maintenance operation.

The invention defined in claim 6 provides a control method for an inkjet printing apparatus which dispenses ink droplets from a print head while transporting a printing medium in a predetermined transport direction to print on the printing medium, and which dries the printing medium at a predetermined drying temperature with a drying unit including at least three heating devices arranged downstream of the print head in the transport direction to heat the printing medium, comprising a step of drying the printing medium with the drying unit including the at least three heating devices arranged downstream of the print head in the transport direction, while storing in memory duty ratios in time series which are proportions of ON time of the heating unit; a step of detecting failure of each of the heating devices; and a step executed, when failure is detected, to manipulate the duty ratio to distribute to normal heating devices a missing duty ratio which is the duty ratio before the failure of the failed heating device among the duty ratios stored.

[Functions and effects] According to the invention defined in claim 6, the printing medium is dried by the drying unit having at least three heating devices, and when failure of a heating device is detected in the detecting step, duty ratios are manipulated to distribute a missing duty ratio which is the duty ratio of the failed heating device to the normal heating devices. Consequently, since the amount of heat decreased when the heating device breaks down can be compensated for by the other heating devices, no lowering will occur to the drying ability. As a result, there is no need to stop the printing process immediately when the failure is detected, but a maintenance operation can be carried out after fully securing time to prepare for the maintenance. Therefore, since a quick maintenance operation can be carried out, the downtime of the apparatus can be restrained. Moreover, since the duty ratio for the failed heating device is distributed based on the duty ratio stored, an appropriate drying process can be continued according to print content of the printing process currently carried out. Consequently, even when the heating devices working normally are substituted to continue the printing process, deterioration in print quality due to the drying process can be restrained.

Advantageous Effects of Invention

According to the inkjet printing apparatus in this invention, the temperature controller controls the drying unit to make temperature of the printing medium become the drying temperature as a result of drying by the drying unit. When the disconnection detecting unit detects failure, the controller of the temperature controller controls the duty ratios to distribute to the normal heating devices the missing duty ratio, among the duty ratios in time series stored in the storage units, which has been given to operate the failed heating device. Consequently, since the amount of heat decreased when the heating device breaks down can be compensated for by the other heating devices, no lowering will occur to the drying ability. As a result, there is no need to stop the printing process immediately when the disconnection detecting unit detects failure, but a maintenance operation can be carried out after fully securing time to prepare for the maintenance. Therefore, since a quick maintenance operation can be carried out, the downtime of the apparatus can be restrained. Moreover, since the duty ratio for the failed heating device is distributed based on the duty ratios stored in the storage units, an appropriate drying process can be continued according to print content of the printing process currently carried out. Consequently, even when the heating devices working normally are substituted to continue the printing process, deterioration in print quality due to the drying process can be restrained.

DESCRIPTION OF EMBODIMENTS

One embodiment of this invention will be described hereinafter with reference to the drawings.

Figure 1:
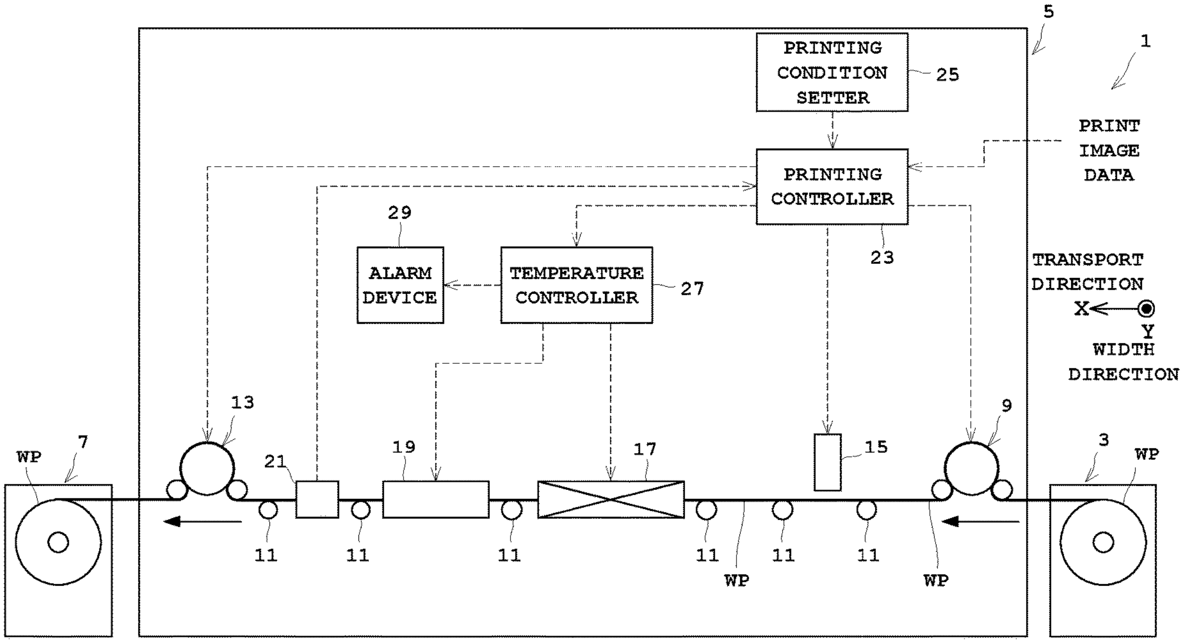
FIG. 1 is a block diagram showing an outline construction of a printing system according to an embodiment.

FIG. 1 is a block diagram showing an outline construction of a printing system according to an embodiment.

A printing system 1 according to this embodiment includes a paper feeder 3, a printing apparatus 5, and a takeup roller 7.

The paper feeder 3 unwinds and feeds web paper WP in a roll form in a transport direction X. The printing apparatus 5 is constructed to be the inkjet type for performing printing by dispensing ink droplets to the web paper WP, and performs the printing on the web paper WP. The takeup roller 7 takes up the printed web paper WP in a roll form.

The above web paper WP corresponds to the "printing medium" in this invention. The above printing apparatus 5 corresponds to the "inkjet printing apparatus" in this invention.

The printing apparatus 5 includes a drive roller 9 disposed in an upstream position for taking in the web paper WP from the paper feeder 3. The web paper WP unwound from the paper feeder 3 by the drive roller 9 is transported along a plurality of transport rollers 11 downstream toward the takeup roller 7. A drive roller 13 is disposed between the most downstream transport roller 11 and the takeup roller 7. The drive roller 13 feeds the web paper WP transported on the transport rollers 11 toward the takeup roller 7.

The printing apparatus 5 includes, between the drive roller 9 and drive roller 13, a print head 15, a drying unit 17, a cooling unit 19, and an inspecting unit 21 arranged in the stated order from upstream. The drying unit 17 heats the web paper WP printed by the print head 15 and dries the ink droplets. The cooling unit 19 cools the web paper WP heated in the drying unit 17. The inspecting unit 21 checks whether the printed portions have stains, omissions or other defects.

The print head 15 performs printing by dispensing ink droplets to the web paper WP. The print head 15 includes a plurality of nozzles (not shown) arranged in a width direction Y of the web paper WP perpendicular to the transport direction X. It would be a construction in general practice to arrange a plurality of (e.g. four) print heads 15 in the transport direction X for enabling multicolor printing. However, to facilitate understanding of the invention, this embodiment provides only one print head 15.

The printing apparatus 5 includes a printing controller 23, a printing condition setter 25, a temperature controller 27, and an alarm device 29. The printing controller 23 receives printing image data from a host computer not shown. The printing controller 23 performs overall control of the drive rollers 9 and 13, print head 15, inspecting unit 21, temperature controller 27, and so on. When performing printing based on the printing image data, the printing controller 23 controls each component according to printing conditions with reference to the printing condition setter 25. The printing conditions are, for example, types of the web paper WP, transporting speeds of the web paper WP, drying temperatures in the drying unit 17, and cooling temperatures in the cooling unit 19.

The temperature controller 27, under control of the printing controller 23, performs temperature control of the drying unit 17 and cooling unit 19. The alarm device 29, when any abnormality occurs in the drying unit 17 or other component, will report it to the operator. The alarm device 29 gives visual information on a display device, lamp, and so on, and/or by sound with a buzzer, for example.

Figure 2:
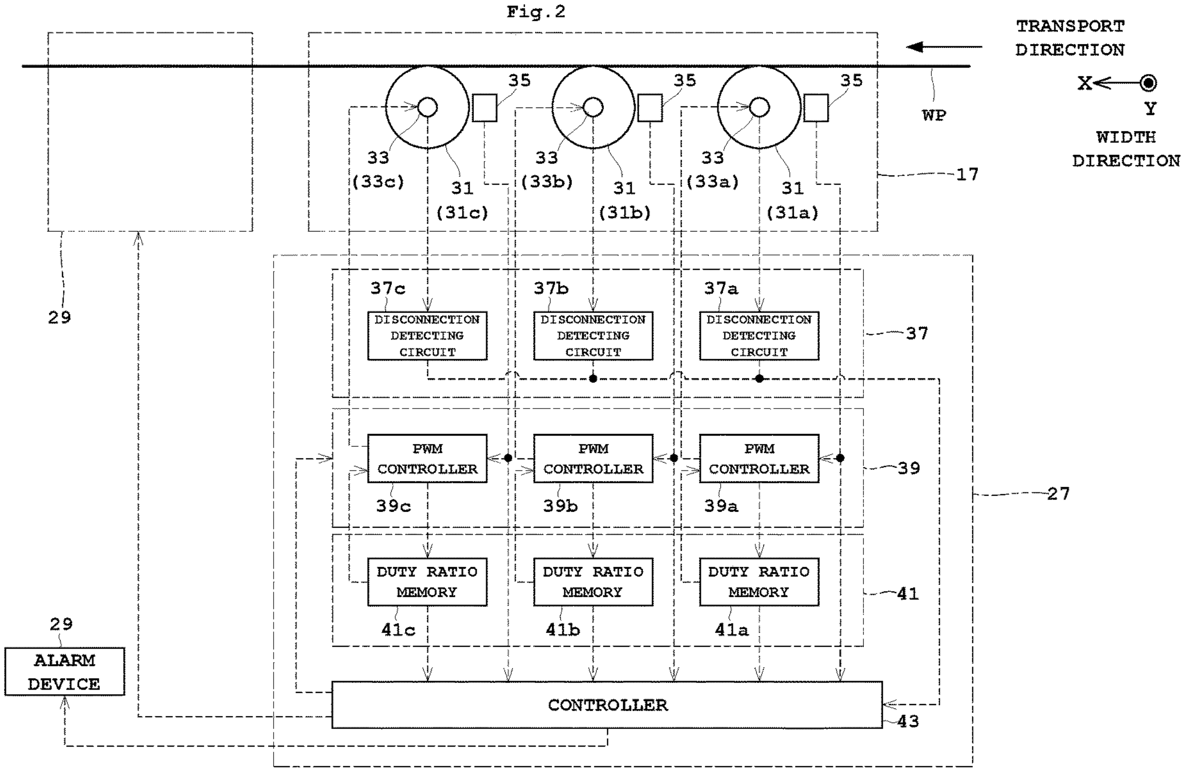
FIG. 2 is a block diagram showing principal portions of a drying unit and a temperature controller.

Reference is now made to FIG. 2. FIG. 2 is a block diagram showing principal portions of the drying unit and temperature controller.

The drying unit 17 has a plurality of heating rollers 31. This embodiment assumes, for example, that the drying unit 17 has three heating rollers 31. The heating rollers 31 are distinguished, where necessary, as heating rollers 31*a*, 31*b*, and 31*c* in order from upstream. Each heating roller 31 contains a halogen lamp 33 adjacent the center thereof. The halogen lamp 33 efficiently radiates light of the infrared region, which heats the heating roller 31 from the interior. When distinguishing the halogen lamps 33 from each other, the term halogen lamps 33*a*-33*c* will be used. The heating roller 31 contacts the surface (lower surface) of web paper WP where the ink droplets do not adhere, to dry the ink droplets adhering to the web paper WP. The drying unit 17 in this embodiment has the three heating rollers 31*a*-31*c* arranged linearly along the transport direction X. The drying unit 17 has a temperature sensor 35 for each of the heating roller 31*a*-31*c* for detecting temperature on the outer circumferential surface of each of the heating rollers 31*a*-31*c*.

The above halogen lamps 33 correspond to the "heating devices" in this invention. The above temperature sensors 35 correspond to the "temperature detectors" in this invention.

The drying unit 17 constructed as described above is controlled by the temperature controller 27. The temperature controller 27 includes disconnection detecting circuits 37, PWM controllers 39, duty ratio memories 41, and a controller 43.

The disconnection detecting circuits 37 detect disconnections of the halogen lamps 33. The disconnection detecting circuits 37 detect the disconnections by detecting states of current supply to the halogen lamps 33. The disconnections, when detected, are notified to the controller 43.

The halogen lamps 33 are controlled by the PWM controllers 39. The PWM controllers 39 control luminance of the halogen lamps 33 through regulation of the ratios (duty ratios) of lighting time within 0 to 100%, which is done by varying pulse width while maintaining the cycles constant. At this time, feedback control is carried out with reference to outputs of the temperature sensors 35.

The duty ratio memories 41 store, in time series, duty ratios which are outputs from the PWM controllers 39. The storage of the duty ratios is performed at intervals of several seconds to several minutes, for example. The stored duty ratios in time series are referred to by the controller 43. Upon receipt of a notice about a disconnection from a disconnection detecting circuit 37, the controller 43 operates the alarm device 29 to report the occurrence of the disconnection. At the same time, the controller 43 reads the duty ratio in time series from the duty ratio memory 41 (41*a*-41*c*) corresponding to the heating roller 31 (31*a*-31*c*) disconnected and broke down. And, as described hereinafter, a control is executed to distribute the duty ratio to the normal heating rollers 31 (31*a*-31*c*). The controller 43 instructs the PWM controllers 39 a control based on the target value of a drying temperature set beforehand by the printing conditions setting unit 25.

The above disconnection detecting circuits 37 correspond to the "failure detection units" in this invention. The duty ratio memories 41 correspond to the "storage units" in this invention.

<When Failure Occurs Upstream of Middle Position>

Figure 3A:
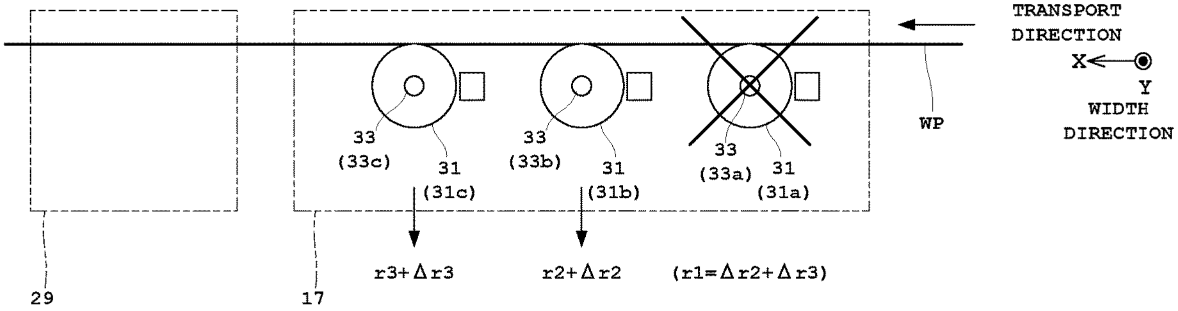
FIG. 3(*a*) shows a state of the drying unit when the most upstream heating roller is disconnected, and (b) is a schematic view showing an example of temperature distribution.
Figure 3B:
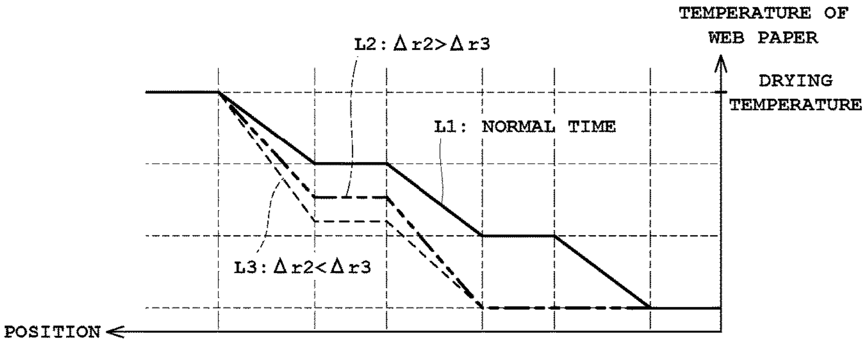
Figure 4:
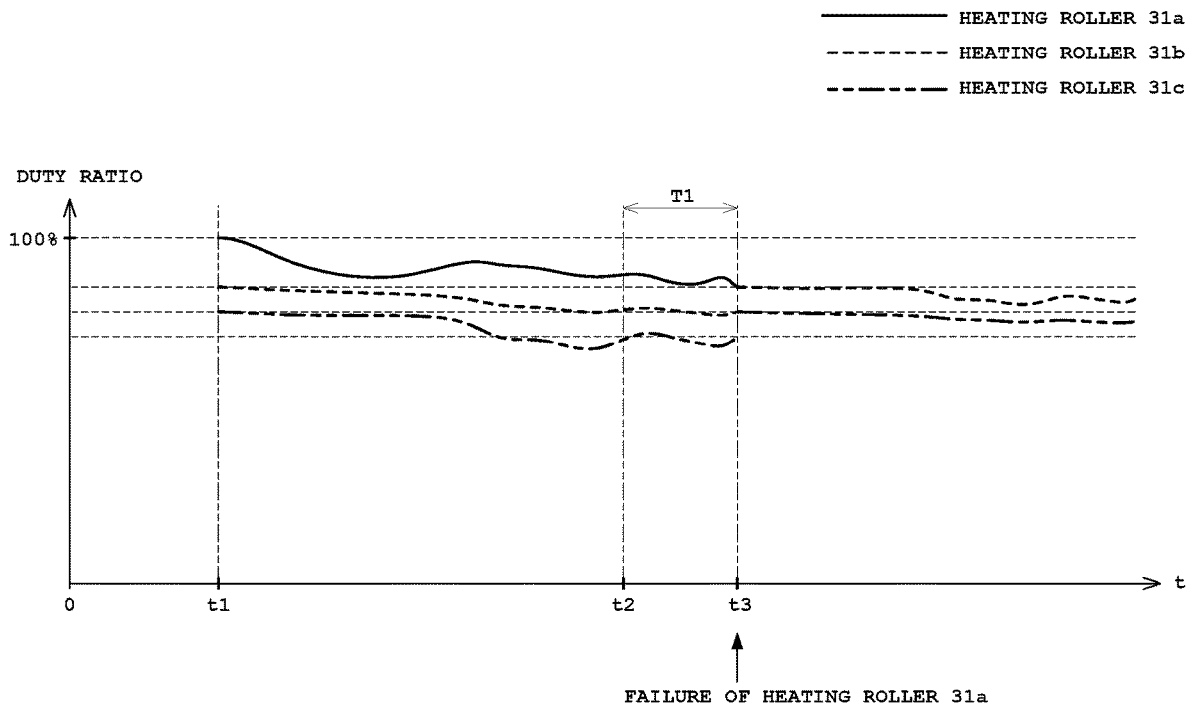
FIG. 4 is a schematic view showing a duty ratio in time series of each heating roller.

Referring now to FIGS. 3 and 4, description will be made of a case in which the most upstream one of the three heating rollers 31*a*-31*c* breaks down, as one example of the cases where a failure occurs upstream of the middle position. In FIG. 3, (a) shows a state of the drying unit when the most upstream heating roller is disconnected, and (b) is a schematic view showing an example of temperature distribution. FIG. 4 is a schematic view showing a duty ratio in time series of each heating roller.

Assume that, as shown in FIG. 4, for example, the drive rollers 9 and 13 begin to rotate at time 0, that the speed of web paper WP reaches a transporting speed and printing is started immediately before time t1, and that a printed area of web paper WP arrives at the drying unit 17 at time t1. And assume that all the three heating rollers 31*a*-31*c* operate normally up to time t1-t2, and that the halogen lamp 33*a* of the most upstream heating roller 31*a* is disconnected at time t3. In FIG. 4, the solid line expresses the duty ratio of halogen lamp 31*a*, the dotted line expresses the duty ratio of halogen lamp 31*b*, and the two-dot chain line expresses the duty ratio of halogen lamp 31*c*. Up to time t1-t2 in FIG. 4, the duty ratios outputted from the respective PWM controllers 39*a*-39*c* to the halogen lamps 33*a*-33*c* are stored in time series in the duty ratio memories 41. The duty ratio memories 41 have storage capacities for storing at least duty ratios of the past for a predetermined period T1 from time t3 when the failure occurred. The predetermined period T1 preferably is on the order of several hours to several days, for example.

At time t1 when drying is started, the most upstream halogen lamp 33*a* is controlled to have the highest duty ratio since its temperature falls easily since the web paper WP contacts the heating roller 31*a* immediately after dispensation of the ink droplets. The halogen lamp 31*b* in the middle position is operated with a lower duty ratio than the halogen lamp 33*a* since it heats the heating roller 33*b* which contacts the web paper WP heated by the most upstream heating roller 31*a*. The most downstream halogen lamp 33*c* is operated with a lower duty ratio than the halogen lamp 33*b* since it heats the heating roller 33*c* which contacts the web paper WP heated in the most upstream and middle positions.

Each duty ratio of the halogen lamps 33*a*-33*c* varies finely, and this is because temperature changes of the heating rollers 31*a*-31*c* occur according to print content printed on the web paper WP. For example, temperature lowers in locations of filling, and therefore the duty ratio is made high. The duty ratio is lowered for locations with many blanks since temperature rises there. Such variations of the duty ratio are made different by the thickness and type of web paper WP, the type of printing medium, transporting speed, and so on, besides print content.

As shown in a solid line L1 in FIG. 3(*b*), the duty ratio given to each of the halogen lamps 33*a*-33*c* is controlled such that the temperature distribution according to the positions of the drying unit 17 at time t1-t2 when the three heating rollers 31*a*-31*c* are operating normally has temperatures gradually higher from most downstream toward most upstream to finally become the drying temperature.

When the halogen lamp 33*a* breaks down at time t3 shown in FIG. 4, the controller 43 detects the failure of halogen lamp 33*a* by notice from the disconnection detecting circuit 37*a*. The controller 43 reads the duty ratio in time series of the past including time t3 from the duty ratio memory 41*a*. What is read now is, for example, the duty ratio in the predetermined period T1 in FIG. 4. Assume that the duty ratios given to the halogen lamps 33*a*-33*c* in the predetermined period T1 in FIG. 4 are, for example, 80%, 70%, and 60% in average values.

The controller 43 distributes the duty ratio (e.g. 80%, which corresponds to the "missing duty ratio" in this invention) of the failed halogen lamp 33*a* to the PWM controllers 39*b* and 39*c* of the normal halogen lamps 33*b* and 33*c*. Assume here that the duty ratios given to the halogen lamps 31*a*-31*c* at the time of normal operation are r1, r2, and r3 in order. When, for example, the duty ratio of halogen lamp 33*a* r1=Δr2+Δr3, the PWM controller 39*b* operates the halogen lamp 33*b* at duty ratio r2+Δr2, and the PWM controller 39*c* operates the halogen lamp 33*c* at duty ratio r3+Δr3 (two-dot chain line L2 in FIG. 3(*b*)). It is preferred here that Δr2 is larger than Δr3 (Δr2>Δr3).

When the most upstream heating roller 31*a* breaks down, the web paper WP is heated first by the heating roller 31*b* in the middle position, and is subsequently cooled by the cooling unit 29 after passing through the most downstream heating roller 31*c*. The drying time from being heated first to being cooled becomes short compared with the case of the most upstream heating roller 33*a* being normal. For this purpose, control is made with the duty ratio in a magnitude relation Δr2>Δr3, to heat first at a somewhat higher temperature with the heating roller 31*b* in the middle position. Then, a substantial drying time can be lengthened, compared with the case where control is made with a duty ratio in the magnitude relation Δr2 <Δr3. That is, the time after the temperature of web paper WP rises to some extent and before the web paper WP reaches the cooling unit 19 can be prevented from becoming short. Consequently, even when the most upstream heating roller 31*a* breaks down, it is possible to prevent a defective drying of the web paper WP due to insufficient drying.

<When Failure Occurs in Middle Position>

Figure 5A:
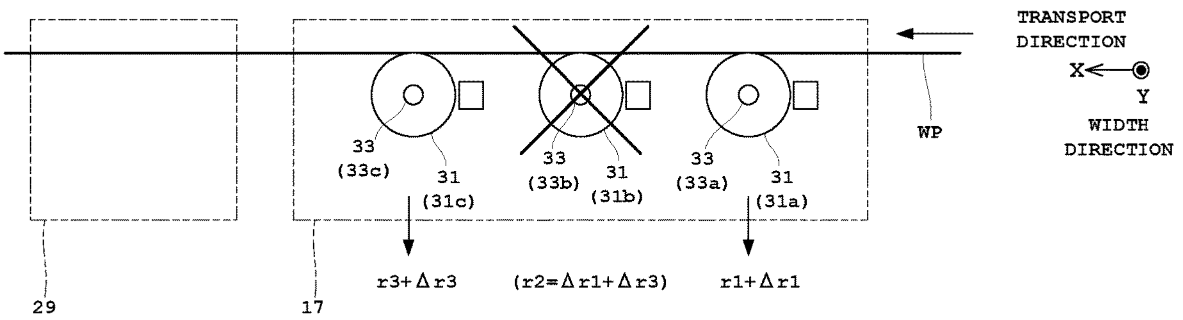
FIG. 5(*a*) shows a state of the drying unit when a middle heating roller is disconnected, and (b) is a schematic view showing an example of temperature distribution.
Figure 5B:
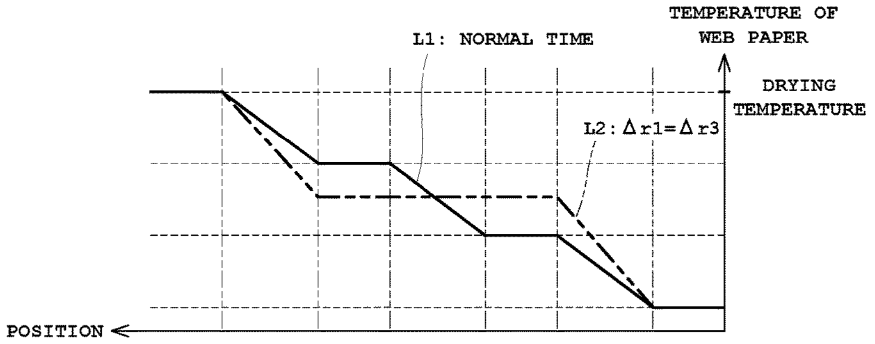

Referring now to FIG. 5, description will be made of an example of control when the middle heating roller 31*b* among the three heating rollers 31*a*-31*c* breaks down. In FIG. 5, (a) shows a state of the drying unit when the heating roller in the middle position is disconnected, and (b) is a schematic view showing an example of temperature distribution.

As shown in a solid line L1 in FIG. 5 (*b*), the duty ratio given to each of the halogen lamps 33*a*-33*c* is controlled such that, when the three heating rollers 31*a*-31*c* are operating normally, temperatures gradually become higher from most downstream toward most upstream to finally become the drying temperature.

The controller 43 detects the failure of halogen lamp 33*b* in the middle heating roller 31*b* by notice from the disconnection detecting circuit 37*b*. The controller 43 reads the duty ratio in time series of the past including the time of occurrence of the failure from the duty ratio memory 41*b*.

The controller 43 distributes the duty ratio (e.g. 70%, which corresponds to the "missing duty ratio" in this invention) of the failed halogen lamp 33*b* to the normal halogen lamps 33*a* and 33*c*. When, for example, the duty ratio of halogen lamp 33*b* r2=Δr1+Δr3, the PWM controller 39*a* operates the halogen lamp 33*a* at duty ratio r1+Δr1, and the PWM controller 39*c* operates the halogen lamp 33*c* at duty ratio r3+Δr3 (two-dot chain line L2 in FIG. 5(*b*)). It is preferred here that Δr1 is equal to Δr3 (Δr1=Δr3). Thus, the most upstream heating roller 31*a* first effects heating at a somewhat high temperature, whereby the drying time from the start of heating to arrival at the cooling unit 19 can be made substantially the same as in normal time. Consequently, even when the middle heating roller 31*b* breaks down, it is possible to prevent a defective drying of the web paper WP due to insufficient drying.

<When Failure Occurs Downstream of Middle Position>

Figure 6A:
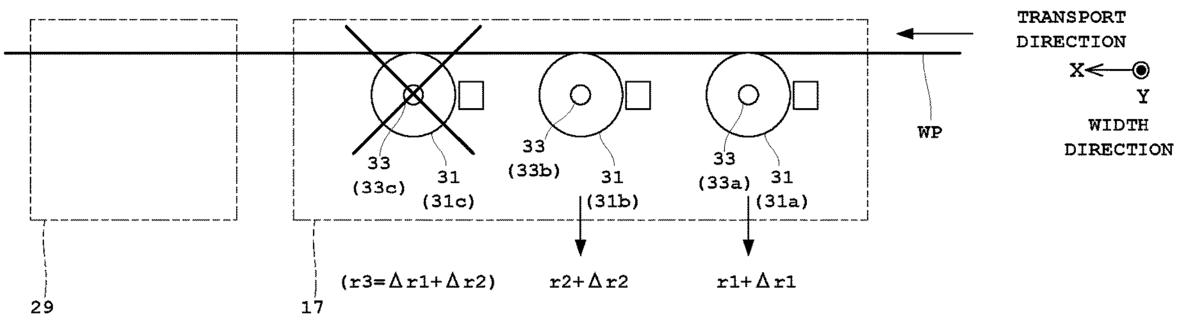
FIG. 6(*a*) shows a state of the drying unit when the most downstream heating roller is disconnected, (b) is a schematic view showing an example of temperature distribution.
Figure 6B:
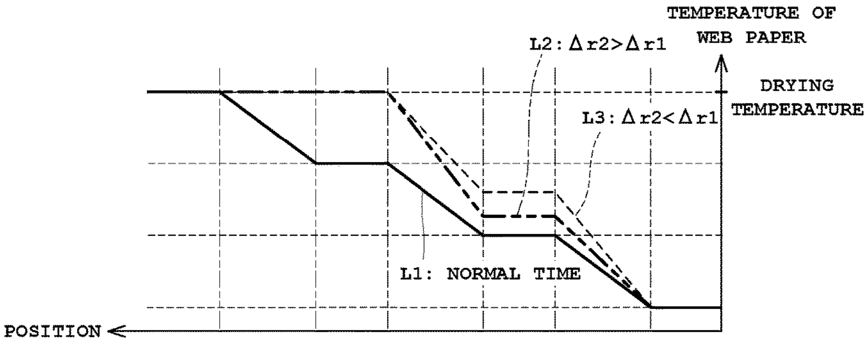

Referring now to FIG. 6, description will be made of a case in which the most downstream heating roller 31*c* among the three heating rollers 31*a*-31*c* breaks down, as one example of the cases where a failure occurs downstream of the middle position. In FIG. 6, (a) shows a state of the drying unit when the most downstream heating roller is disconnected, and (b) is a schematic view showing an example of temperature distribution.

The controller 43 detects the failure of halogen lamp 33*c* in the most downstream heating roller 31*c* by notice from the disconnection detecting circuit 37*c*. The controller 43 reads the duty ratio in time series of the past including the time of occurrence of the failure from the duty ratio memory 41*c*.

The controller 43 distributes the duty ratio (e.g. 60%, which corresponds to the "missing duty ratio" in this invention) of the failed halogen lamp 33*c* to the normal halogen lamps 33*a* and 33*b*. When, for example, the duty ratio of halogen lamp 33*c* r3=Δr1+Δr2, the PWM controller 39*a* operates the halogen lamp 33*a* at duty ratio r1+Δr1, and the PWM controller 39*b* operates the halogen lamp 33*b* at duty ratio r2+Δr2 (two-dot chain line L2 in FIG. 6(*b*)). It is preferred here that Δr2 is larger than Δr1 (Δr2>Δr1).

The web paper WP is dried first by the most upstream heating roller 31*a*. When the temperature at this time is too much higher than at normal time, the web paper WP will be dried to excess, causing a phenomenon of the ink droplets on the web paper WP rapidly becoming too dry. Then, the drying process will wrinkle the web paper WP, and the wrinkles will result in defective drying. Therefore, control is performed with the duty ratio in a magnitude relation Δr2>Δr1, for the most upstream heating roller 31*a* to effect heating moderately first, thereby preventing wrinkle formation. As a result, even when the most downstream heating roller 31*c* breaks down, it is possible to prevent defective drying due to excessive drying.

According to this embodiment, when a disconnection detecting circuit 37 detects failure, the controller 43 controls the duty ratios to distribute to the normal heating rollers 31 the duty ratio having been given to operate the failed heating roller 31, among the duty ratios in time series stored in the duty ratio memories 41. Consequently, since the amount of heat decreased when the heating roller 31 breaks down can be compensated for by the other heating rollers 31, no defective drying will occur. As a result, there is no need to stop the printing process immediately when the disconnection detecting circuit 37 detects failure, but a maintenance operation can be carried out after fully securing time to prepare for the maintenance. Therefore, since a quick maintenance operation can be carried out, the downtime of the printing apparatus 5 can be restrained. Moreover, since the duty ratio for the failed heating roller 31 is distributed based on the duty ratios stored in the duty ratio memories 41, an appropriate drying process can be continued according to print content of the printing process currently carried out. Consequently, even when the heating rollers 31 working normally are substituted to continue the printing process, deterioration in print quality due to the drying process can be restrained.

This invention is not limited to the foregoing embodiment, but may be modified as follows:

(1) In the foregoing embodiment, the drying unit 17 has a plurality of heating rollers 31*a*-31*c* arranged linearly. This invention is not limited to such construction. For example, it is applicable even where the drying unit 17 has a plurality of heating rollers 31 arranged annularly.

(2) In the foregoing embodiment, the drying unit 17 has three heating rollers 31. This invention is not limited to such construction. For example, it may have four or more heating rollers 31. Even with such construction, the duty ratio (corresponding to the amount of heat) applied to the failed heating roller 31 may be distributed to the remaining normal heating rollers 31. In that case, it is preferred to prevent faulty drying or to keep drying time from becoming short as noted hereinbefore. When the amount of heat of one heating device cannot be compensated for with the amounts of heat of two heating devices, compensation may be made with the amounts of heat of three or more heating devices.

(3) In the foregoing embodiment, the failure detection unit consists of the disconnection detecting circuits 37*a*-37*c*. This invention is not limited to this construction. That is, since what is necessary is just to be able to detect failure of the halogen lamps 33*a*-33*c*, failure detection may be performed with light sensors, for example, which detect luminance of the respective halogen lamps 33*a*-33*c*.

(4) The foregoing embodiment has been described taking for example the case of halogen lamps 33 as heating devices. This invention is not limited to the halogen lamps 33. For example, the halogen lamps 33 may be replaced with heaters or warm air generators.

(5) In the foregoing embodiment, only the duty ratio of the predetermined period T1 is distributed with an average value calculated from time t3 of failure occurrence, from among the duty ratios in time series as shown in FIG. 4. However, this invention is not limited to such technique. That is, an average value may be calculated using all the duty ratios stored, or an average value of the duty ratio may be calculated only with respect to ranges that are the same as conditions set by the printing condition setter 25.

(6) In the foregoing embodiment, the web paper WP is illustrated as printing medium. This invention is applicable also to printing media other than paper. Plastic film can be cited as an example.

INDUSTRIAL UTILITY

As described above, this invention is suitable for an inkjet printing apparatus including a drying unit having a plurality of heating devices, and a control method therefor.

REFERENCE SIGNS LIST

1 . . . printing system
3 . . . paper feeder
X . . . transport direction
Y . . . width direction
5 . . . printing apparatus
7 . . . takeup roller
9, 13 . . . drive rollers
11 . . . transport rollers
17 . . . drying unit
27 . . . temperature controller
29 . . . alarm device

31 (31*a*-31*c*) . . . heating rollers
33 (33*a*-33*c*) . . . halogen lamps
35 . . . temperature sensors
37 (37*a*-37*c*) . . . disconnection detecting circuits
41 (41*a*-41*c*) . . . duty ratio memories
43 . . . controller

The invention claimed is:

1. An inkjet printing apparatus for dispensing ink droplets from a print head while transporting a printing medium in a predetermined transport direction to print on the printing medium, comprising:

a drying unit for drying, at a predetermined drying temperature, the printing medium on which the print head prints by dispensing the ink droplets, wherein the drying unit includes at least three heating devices arranged downstream of the print head in the predetermined transport direction to heat the printing medium; and a temperature controller for controlling the drying unit to make temperature of the printing medium become the predetermined drying temperature by finishing a drying process in the drying unit, wherein the temperature controller includes:

a temperature detector for detecting temperature of each of the heating devices;

a controller for manipulating a duty ratio, which is a proportion of ON time of each of the heating devices, according to the temperature detected by the temperature detector;

a storage unit for storing the duty ratio in time series of each of the heating devices; and a failure detection unit for detecting failure of each of the heating devices, wherein the controller is configured, when the failure detection unit detects failure, to manipulate the duty ratio to distribute to normal heating devices a missing duty ratio which is the duty ratio before the failure of a failed heating device among duty ratios stored in the storage units, and wherein the normal heating devices are contributing to heating the printing medium when failure detection unit detects the failure of the failed heating device.

2. The inkjet printing apparatus according to claim 1, wherein the controller is configured, when the failure is detected in one of the at least three heating devices, to manipulate the duty ratios so that the remaining heating devices have temperatures gradually higher from most upstream to most downstream, thereby reaching the drying temperature at most downstream.

3. The inkjet printing apparatus according to claim 1, wherein the controller is configured, when the failure is detected in a heating device upstream of a middle one of the at least three heating devices, to distribute the missing duty ratio in a larger quantity to a heating device located relatively upstream than to a heating device located relatively downstream, of the heating devices excluding the failed heating device.

4. The inkjet printing apparatus according to claim 1, wherein the controller is configured, when the failure is detected in a heating device in a middle position of the at least three heating devices, to distribute the missing duty ratio equally to the heating devices upstream and downstream of said heating device.

5. The inkjet printing apparatus according to claim 1, wherein the controller is configured, when the failure is detected in a heating device downstream of a middle one of the at least three heating devices, to distribute the missing duty ratio in a larger quantity to a heating device located relatively downstream than to a heating device located relatively upstream, of the heating devices excluding the failed heating device.

6. A control method for an inkjet printing apparatus which dispenses ink droplets from a print head while transporting a printing medium in a predetermined transport direction to print on the printing medium, and which dries the printing medium at a predetermined drying temperature with a drying unit including at least three heating devices arranged downstream of the print head in the predetermined transport direction to heat the printing medium, the control method comprising:

drying the printing medium with the drying unit including the at least three heating devices arranged downstream of the print head in the transport direction, while storing in memory duty ratios in time series which are proportions of ON time of each of the heating devices;

detecting failure of each of the heating devices; and when the failure is detected, manipulating the duty ratio to distribute to normal heating devices a missing duty ratio which is the duty ratio before the failure of a failed heating device among the duty ratios stored, and wherein the normal heating devices are contributing to heating the printing medium when failure detection unit detects the failure of the failed heating device.

* * * * *